US012159597B2

(12) United States Patent
Leong et al.

(10) Patent No.: US 12,159,597 B2
(45) Date of Patent: Dec. 3, 2024

(54) BACKLIGHT CONTROL DEVICE

(71) Applicant: REALTEK SEMICONDUCTOR CORP., Hsinchu (TW)

(72) Inventors: Pui-Kei Leong, Hsinchu (TW); Wun-Lin Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 41 days.

(21) Appl. No.: 17/983,663

(22) Filed: Nov. 9, 2022

(65) Prior Publication Data

US 2023/0154421 A1 May 18, 2023

(30) Foreign Application Priority Data

Nov. 15, 2021 (TW) ................................ 110142460

(51) Int. Cl.

| | |
|---|---|
| ***G09G 3/34*** | (2006.01) |
| ***G09G 5/393*** | (2006.01) |
| *G09G 3/36* | (2006.01) |

(52) U.S. Cl.

CPC ........... *G09G 3/3426* (2013.01); *G09G 5/393* (2013.01); *G09G 3/3611* (2013.01); *G09G 2310/08* (2013.01); *G09G 2320/0276* (2013.01); *G09G 2320/0626* (2013.01); *G09G 2340/045* (2013.01); *G09G 2360/14* (2013.01); *G09G 2360/18* (2013.01); *G09G 2370/10* (2013.01); *G09G 2370/14* (2013.01)

(58) Field of Classification Search

CPC .... G09G 3/3426; G09G 5/393; G09G 3/3611; G09G 2310/08; G09G 2320/0276; G09G 2320/0626; G09G 2340/045; G09G 2360/14; G09G 2360/18; G09G 2370/10; G09G 2370/14

See application file for complete search history.

(56) References Cited

U.S. PATENT DOCUMENTS

2009/0021469 A1* 1/2009 Yeo ...................... G09G 3/3413 345/102
2009/0135195 A1* 5/2009 Chen .................... G09G 3/3426 345/589
2009/0231365 A1* 9/2009 Yin ...................... G09G 3/3406 345/690

(Continued)

*Primary Examiner* — Roy P Rabindranath

(74) *Attorney, Agent, or Firm* — Birch, Stewart, Kolasch & Birch, LLP

(57) ABSTRACT

A backlight control device adapted to control a plurality of backlight sources is provided. The backlight control device includes a timing control circuitry and a local-dimming control circuitry. The timing control circuitry is configured to generate a transmission packet according to a first customized content specification, where the transmission packet includes control information and brightness information. The timing control circuitry includes a differential circuit, where the differential circuit is configured to transmit the transmission packet according to a differential voltage level. The local-dimming control circuitry includes a receiving circuit electrically coupled to the differential circuit. The receiving circuit is configured to receive the transmission packet. The local-dimming control circuitry is configured to transmit a light source control signal according to the control information and the brightness information.

14 Claims, 8 Drawing Sheets

(56) References Cited

U.S. PATENT DOCUMENTS

| | | | | |
|---|---|---|---|---|
| 2011/0050554 | A1* | 3/2011 | Yu | G09G 3/3611 345/102 |
| 2011/0148941 | A1* | 6/2011 | Kim | G09G 3/3426 345/102 |
| 2011/0249033 | A1* | 10/2011 | Oh | G09G 3/3648 345/690 |
| 2014/0292634 | A1* | 10/2014 | Kita | G09G 3/342 345/102 |
| 2015/0187304 | A1* | 7/2015 | Ko | G06F 1/3265 345/94 |
| 2015/0310824 | A1 | 10/2015 | Yang et al. | |
| 2016/0322004 | A1* | 11/2016 | Yashiki | G09G 3/3685 |
| 2020/0302862 | A1 | 9/2020 | Sun et al. | |
| 2021/0174749 | A1* | 6/2021 | Guo | G06F 3/041 |

* cited by examiner

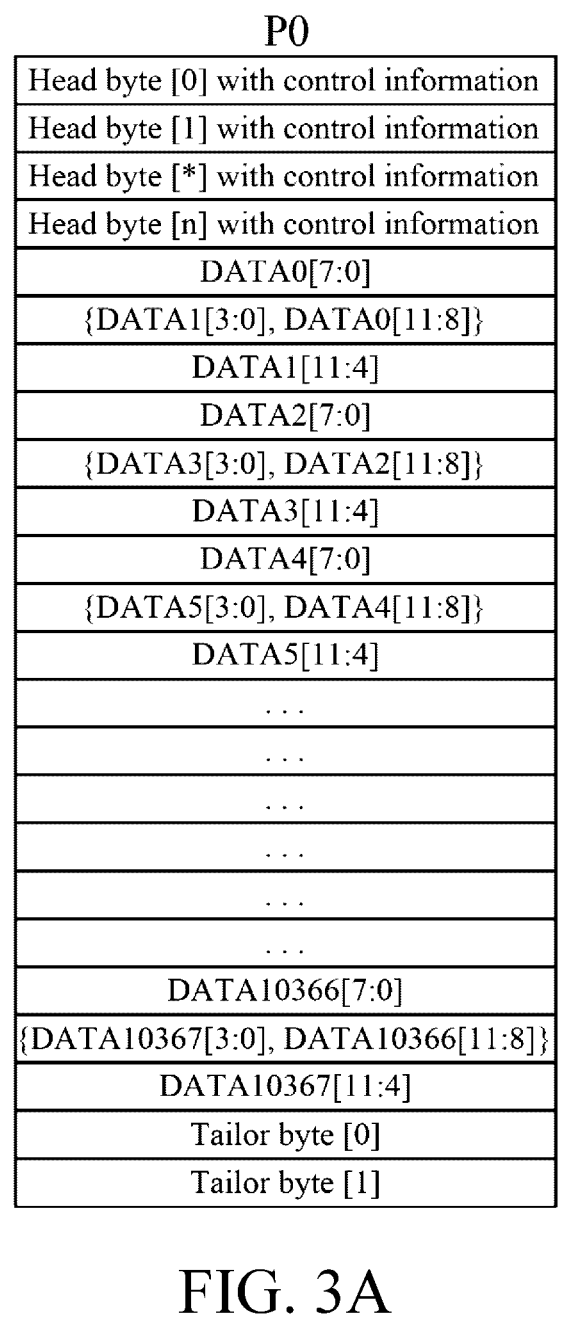

| P0 |
| --- |
| Head byte [0] with control information |
| Head byte [1] with control information |
| Head byte [*] with control information |
| Head byte [n] with control information |
| DATA0[7:0] |
| {DATA1[3:0], DATA0[11:8]} |
| DATA1[11:4] |
| DATA2[7:0] |
| {DATA3[3:0], DATA2[11:8]} |
| DATA3[11:4] |
| DATA4[7:0] |
| {DATA5[3:0], DATA4[11:8]} |
| DATA5[11:4] |
| . . . |
| . . . |
| . . . |
| . . . |
| . . . |
| . . . |
| DATA10366[7:0] |
| {DATA10367[3:0], DATA10366[11:8]} |
| DATA10367[11:4] |
| Tailor byte [0] |
| Tailor byte [1] |

FIG. 3A

| P0 | P1 |
|---|---|
| Head byte [0] with control information | Head byte [0] with control information |
| Head byte [1] with control information | Head byte [1] with control information |
| Head byte [*] with control information | Head byte [*] with control information |
| Head byte [n] with control information | Head byte [n] with control information |
| DATA0[7:0] | DATA2[7:0] |
| {DATA1[3:0], DATA0[11:8]} | {DATA3[3:0], DATA2[11:8]} |
| DATA1[11:4] | DATA3[11:4] |
| DATA4[7:0] | DATA6[7:0] |
| {DATA5[3:0], DATA4[11:8]} | {DATA7[3:0], DATA6[11:8]} |
| DATA5[11:4] | DATA7[11:4] |
| . . . | . . . |
| . . . | . . . |
| . . . | . . . |
| DATA10364[7:0] | DATA10366[7:0] |
| {DATA10365[3:0], DATA10364[11:8]} | {DATA10367[3:0], DATA10366[11:8]} |
| DATA10365[11:4] | DATA10367[11:4] |
| Tailor byte [0] | Tailor byte [0] |
| Tailor byte [1] | Tailor byte [1] |
| | |
| | |
| | |
| | |
| | |
| | |

FIG. 3B

BACKLIGHT CONTROL DEVICE

CROSS-REFERENCE TO RELATED APPLICATION

This non-provisional application claims priority under 35 U.S.C. § 119 (a) to patent application No. 110142460 filed in Taiwan, R.O.C. on Nov. 15, 2021, the entire contents of which are hereby incorporated by reference.

BACKGROUND

Technical Field

The present invention relates to a control device of a backlight panel.

Related Art

According to various application needs, a flat-panel display often needs to use a transmission interface to transmit backlight data to a backlight module. For example, the backlight data is transmitted to the backlight module through the transmission interface, to control the brightness of a backlight source, or a plurality of backlight sources for partitioned backlighting are separately controlled through the transmission interface. Conventional backlight data transmission interfaces adopt transmission protocols such as serial peripheral interface (SPI), inter-integrated circuit ($I^2C$), RS-232, transistor-transistor logic (TTL), or the like. These transmission interfaces provide point-to-point signal transmission between a panel control chip and single or a plurality of backlight sources. Taking the SPI as an example, four wires are needed for single-point control, which are respectively serial clock (SCLK), master output slave input (MOSI), master input slave output (MISO), and slave select (SS).

With the development of the market trend, the demand for large-size and high-resolution displays is increasing. To provide a large-size and high-resolution display, one resolution is to provide a display with a large amount of partition backlight sources. However, under a conventional transmission architecture, the display needs to use a large amount of wires to control the large amount of backlight sources.

When the display uses a large amount of wires, at least the following problems are caused: (1) The cost for the wiring increases; (2) The quantity of I/O of the transmitting end chip or receiving end chip increases, causing the production cost to increase; (3) The space occupied by the wiring increases; (4) The complexity of the system needs to be increased, to resolve the problem of transmission delay skew caused by inconsistent wiring distances; and (5) Mutual interference of electromagnetic noise is likely to happen among the large amount of wires. To reduce the electromagnetic interference, the transmission speed of the display using the conventional transmission interfaces cannot be excessively high.

SUMMARY

In view of this, according to some embodiments, a device adapted for controlling a plurality of backlight sources is provided. The device comprises a timing control circuitry and a local-dimming control circuitry. The timing control circuitry is configured to generate a transmission packet according to a first customized content specification, where the transmission packet includes control information and brightness information. The timing control circuitry includes a first differential circuit, where the first differential circuit is configured to transmit the transmission packet according to a differential voltage level. The local-dimming control circuitry includes a first receiving circuit, where the first receiving circuit is electrically coupled to the first differential circuit. The first receiving circuit is configured to receive the transmission packet. The local-dimming control circuitry is configured to transmit a light source control signal according to the control information and the brightness information.

BRIEF DESCRIPTION OF THE DRAWINGS

FIG. 3A is a schematic diagram of a transmission packet according to some embodiments;

FIG. 3B is a schematic diagram of a transmission packet according to some other embodiments;

DETAILED DESCRIPTION

Figure 1:
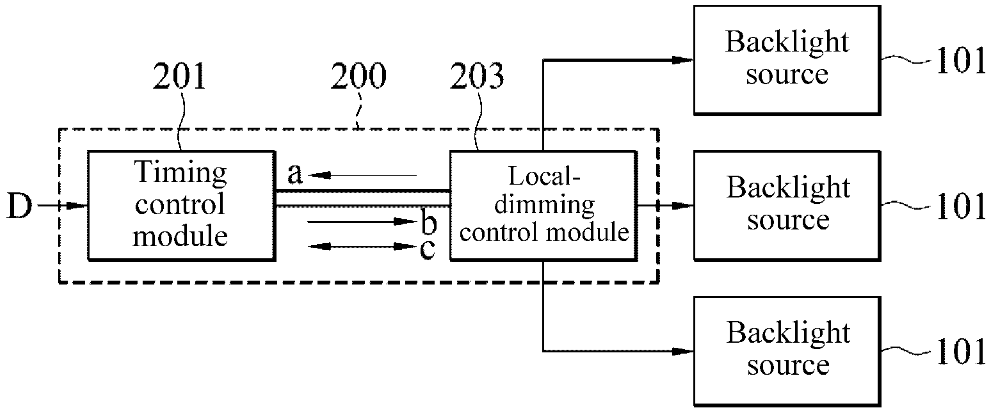
FIG. 1 is a schematic block diagram of a backlight control device and backlight sources according to some embodiments.

FIG. 1 is a schematic block diagram of a backlight control device and backlight sources according to some embodiments. Referring to FIG. 1, according to some embodiments, a backlight control device 200 controls a plurality of backlight sources 101. The backlight source 101 may refer to a light source that emit light actively, such as but not limited to an incandescent light bulb, a light-emitting diode, a fluorescent lamp, or a light-emitting panel. The backlight source 101 may be a direct-lit backlight source directly disposed on the back of a liquid crystal panel to provide lighting, or may be an edge-lit light source disposed on a side of the liquid crystal panel to provide lighting through a reflector or a light guide plate. According to some embodiments, the plurality of backlight sources 101 are arranged in an array, to provide partitioned backlighting.

The backlight control device 200 includes a timing control circuitry 201 and a local-dimming control circuitry 203. According to some embodiments, the timing control circuitry 201 includes a timing controller (TCON) 2015. The timing control circuitry 201 receives image data D, and generates one or more transmission packets used for controlling the backlight sources 101 according to a first customized content specification. The transmission packet includes control information and brightness information, which are described in detail below.

The timing control circuitry 201 includes a first differential circuit 2011, where the first differential circuit 2011 transmits the transmission packet according to a differential voltage level. According to some embodiments, a configuration of the differential circuit is based on circuit logic of a differential architecture such as low voltage differential signaling (LVDS), emitter coupled logic (ECL), positive emitter coupled logic (PECL), or current mode logic (CML).

According to some embodiments, the local-dimming control circuitry 203 includes a backlight controller (BCON) 2035. For example, the BCON 2035 is based on pulse-width modulation (PWM) dimming or analog dimming. The local-dimming control circuitry 203 receives the transmission packet, and generates a light source control signal according to the control information and the brightness information included in the transmission packet, to control the backlight sources 101. The local-dimming control circuitry 203 includes a first receiving circuit 2031 electrically coupled to the first differential circuit 2011. According to some embodiments, the first receiving circuit 2031 is a voltage detection circuit with a high input impedance, such as an operational amplifier or a buffer.

According to some embodiments, the timing control circuitry 201 includes a digital-to-analog converter, where the digital-to-analog converter converts the transmission packet into the differential voltage level and transmits the differential voltage level to the first receiving circuit 2031 of the local-dimming control circuitry 203 through the first differential circuit 2011. Correspondingly, the local-dimming control circuitry 203 includes an analog-to-digital converter, where the analog-to-digital converter is configured to convert the differential voltage level back into the transmission packet.

Figure 2:
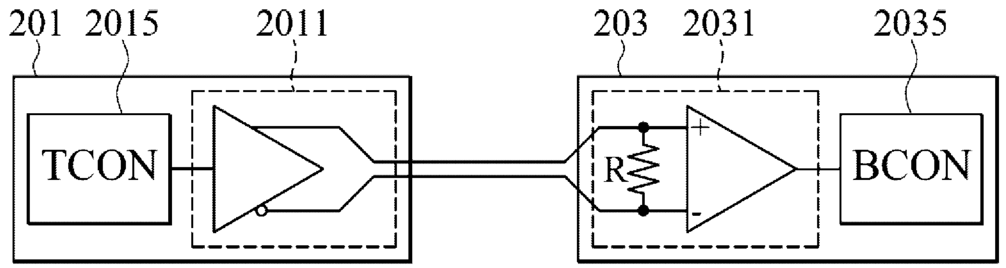
FIG. 2 is a schematic diagram of a timing control module and a local-dimming control module according to a first embodiment.

FIG. 2 is a schematic diagram of a timing control circuitry and a local-dimming control circuitry according to a first embodiment. Referring to FIG. 2, according to some embodiments, the timing control circuitry 201 includes the TCON 2015 and the first differential circuit 2011; and the local-dimming control circuitry 203 includes the first receiving circuit 2031 and the BCON 2035. The first differential circuit 2011 of the timing control circuitry 201 generates a differential signal, to transmit the transmission packet. The first receiving circuit 2031 of the local-dimming control circuitry 203 is electrically coupled to the first differential circuit 2011 through a pair of transmission lines, to receive the differential signal. The differential signal may be a voltage signal or a current signal, which causes the differential voltage level. The differential voltage level may be classified by a standard for distinguishing a high logic level or a low logic level. For example, the first differential circuit 2011 is a current source configured to provide a current signal with a differential voltage level of plus or minus 3.5 mA. The current signal flows through a resistor R that is bridged to the transmission lines and has a resistance of 100Ω, and generates a voltage level of plus or minus 350 mV between both ends of the resistor R. The first receiving circuit 2031 measures the foregoing voltage level. The voltage level of plus 350 mV is classified as a high logic level, and the voltage level of minus 350 mV is classified as a low logic level.

The timing control circuitry 201 generates the transmission packet according to the first customized content specification. According to some embodiments, the first customized content specification is used for compiling the brightness information corresponding to a plurality of backlight sources 101 into the transmission packet, so that the transmission packet is adapted to be transmitted through the first differential circuit 2011. According to some embodiments, the transmission packet includes a start byte, a data sequence, and an end byte. FIG. 3A is a schematic diagram of a transmission packet according to some embodiments. Taking a transmission packet P0 shown in FIG. 3A as an example, the transmission packet P0 includes fields of a start byte from Head byte[0] to Head byte[n], fields of a data sequence from DATA0[7:0] to DATA10367[11:4], and fields of an end byte from Tailor byte[0] to Tailor byte[1]. The first differential circuit 2011 transmits field contents of the transmission packet bit by bit.

According to some embodiments, the start byte marks the beginning of data. When the first receiving circuit 2031 receives the start byte, the local-dimming control circuitry 203 determines that a new transmission packet is received. The data sequence stores the brightness information used for controlling each of the backlight sources 101. For example, the transmission packet P0 according to an embodiment shown in FIG. 3A is used for controlling 10368 backlight sources 101, and each of the backlight sources 101 corresponds to brightness information of 12 bits. Therefore, DATA0[7:0] (8 bits) of the first field and DATA0[11:8] (4 bits) of the second field of the data sequence correspond to a No. 0 backlight source 101; and DATA1 [3:0] (4 bits) of the second field of the data sequence and DATA1 [11:4] (8 bits) of the third field of the data sequence correspond to a No. 1 backlight source 101, and so on. The brightness information corresponding to each of the backlight sources 101 may not be of 8 bits (for example, 12 bits in the embodiment shown in FIG. 3A). Therefore, according to some embodiments, the start byte includes the control information. The control information may be used for informing the local-dimming control circuitry 203 of a quantity of bits of the brightness information corresponding to each of the backlight sources 101. According to some embodiments, the end byte marks the end of data, and when the first receiving circuit 2031 receives the end byte, the local-dimming control circuitry 203 determines that the received transmission packet ends.

FIG. 3B is a schematic diagram of a transmission packet according to some other embodiments. Referring to FIG. 3A and FIG. 3B together, in the embodiment shown in FIG. 3A, the single transmission packet P0 stores the brightness information corresponding to a total of 10368 backlight sources 101. According to some embodiments, the transmission packet P0 is transmitted by a set of a first differential circuit 2011 and a first receiving circuit 2031. In an embodiment shown in FIG. 3B, two transmission packets including a transmission packet P0 and a transmission packet P1 store the brightness information corresponding to the total of 10368 backlight sources 101. According to some embodiments, the transmission packet P0 and the transmission packet P1 are separately transmitted by two sets of a first differential circuit 2011 and a first receiving circuit 2031, thereby improving the transmission speed.

According to some embodiments, the brightness information corresponding to each of the backlight sources 101 is compiled into one or more transmission packets according to the first customized content specification. For example, in the embodiment shown in FIG. 3A, first 12 bits of the data sequence of the transmission packet P0 correspond to the No. 0 backlight source 101, and by analogy to No. 1, No. 2, . . . , and No. 10367 of the backlight sources 101.

Therefore, the brightness information stored in the data sequence corresponds to a number sequence of the backlight sources 101 in sequence. In the embodiment shown in FIG. 3B, first 12 bits of a data sequence of the transmission packet P0 correspond to the No. 0 backlight source 101, and by analogy to No. 1, No. 4, No. 5, . . . , and No. 10365 of the backlight sources 101; and first 12 bits of a data sequence of the transmission packet P1 correspond to the No. 2 backlight source 101, and by analogy to No. 3, No. 6, No. 7, . . . , and No. 10367 of the backlight sources 101. Therefore, all of the brightness information is alternately stored in the two transmission packets with every two pieces of brightness information as a cycle. According to some embodiments, to resolve the problem of data correspondence of a plurality of transmission packets in transmission, the start byte includes the control information. The control information enables the local-dimming control circuitry 203 to identify the brightness information stored in each of the transmission packets, and each of the backlight sources 101 corresponding to the brightness information.

As described above, according to some embodiments, a transmission interface between the timing control circuitry 201 and the local-dimming control circuitry 203 adopts a differential configuration. According to some embodiments, the backlight control device 200 adopts a sequence transmission solution of quick data transmission instead of a parallel transmission solution of synchronous data transmission adopted by a conventional transmission interface, thereby resolving problems derived from the large amount of wires used by a conventional display. In this way, the backlight control device 200 allows control over a large amount of backlight sources 101. For example, a conventional interface needs 8 sets of SPIs and 32 wires in total to transmit parallel data of 8 bits. For a data volume of the 10368 backlight sources 101 and the brightness information of 12 bits, and considering the limitation of each frame within 1 ms (with a vertical blanking time of a scanning liquid crystal panel <1 ms), a transmission speed of a single SPI needs to be 10368*12 bit/8 port/1 ms=15.552 Mbps, which is still lower than a transmission upper limit of 20 Mbps of the SPI. By comparison, a differential configuration needs a single set of a differential transmission interface and 2 wires in total to transmit sequence data. Taking an LVDS transmission interface as an example, for transmission of the data volume of the 10368 backlight sources 101 and the brightness information of 12 bits, and considering the limitation of each frame within 1 ms, a transmission speed of a single LVDS needs to be 10368*12 bit/1 pair/1 ms=124.416 Mbps, which is far lower than a transmission upper limit of 600 Mbps of the LVDS. According to some embodiments, the timing control circuitry 201 generates the transmission packet according to the first customized content specification, and the local-dimming control circuitry 203 parses the received transmission packet according to the first customized content specification, and further determines the correspondence between the brightness information of the transmission packet and the backlight sources 101.

Figure 4:
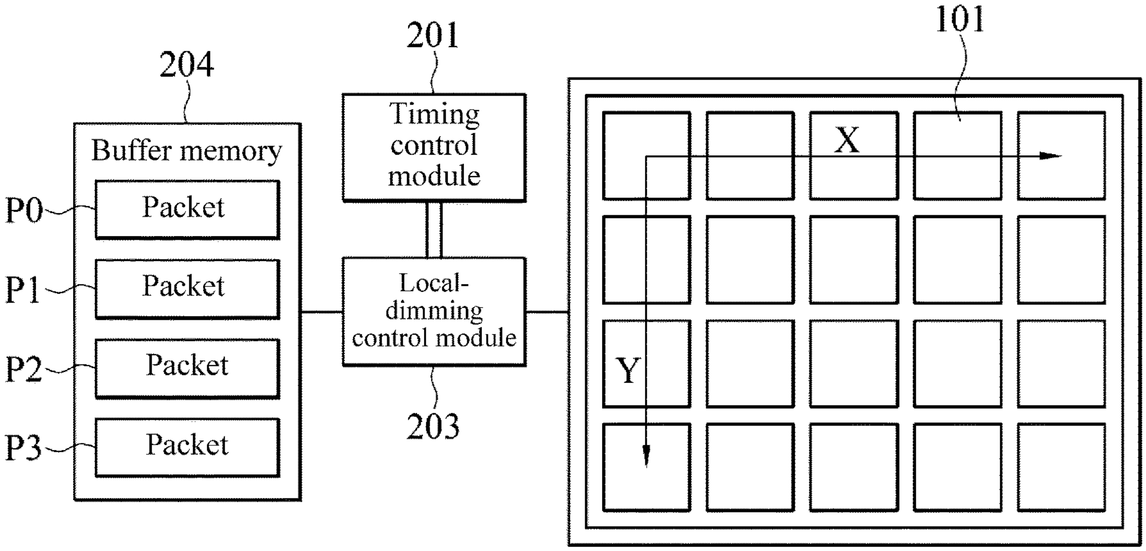
FIG. 4 is a schematic diagram of an operation status of a backlight control device according to some embodiments.

FIG. 4 is a schematic diagram of an operation status of a backlight control device according to some embodiments. Referring to FIG. 4, according to some embodiments, the backlight control device 200 includes the timing control circuitry 201, the local-dimming control circuitry 203, and a buffer memory 204. The buffer memory 204 is electrically coupled to the local-dimming control circuitry 203 and is configured to temporarily store the transmission packet. According to some embodiments, the timing control circuitry 201 generates transmission packets frame by frame, and each of the transmission packets includes the brightness information of all of the backlight sources 101. After being transmitted to the local-dimming control circuitry 203 by the timing control circuitry 201, the transmission packets are forwarded by the local-dimming control circuitry 203 to and temporarily stored in the buffer memory 204. For example, in an embodiment shown in FIG. 4, a transmission packet P0, a transmission packet P1, a transmission packet P2, and a transmission packet P3 respectively store brightness information of four frames F. According to some embodiments, the timing control circuitry 201 generates a plurality of transmission packets frame F by frame F. The plurality of transmission packets are transmitted to and temporarily stored in the buffer memory 204. For example, in the embodiment shown in FIG. 4, the transmission packet P0, the transmission packet P1, the transmission packet P2, and the transmission packet P3 store brightness information respectively corresponding to four sets of backlight sources 101 within a range of one frame F.

According to some embodiments, the local-dimming control circuitry 203 of the backlight control device 200 transmits the light source control signal to the plurality of backlight sources 101 one by one in a scanning manner. For example, referring to FIG. 4, the local-dimming control circuitry 203 adjusts the backlight sources 101 one by one from left to right according to a scanning axis X, moves to a next row according to a scanning axis Y when moving to the rightmost, and adjusts the backlight sources 101 one by one again according to the scanning axis X. Therefore, when scanning to a specific backlight source 101, the local-dimming control circuitry 203 needs to adjust the specific backlight source 101 according to brightness information corresponding to the specific backlight source 101. According to some embodiments, before the local-dimming control circuitry 203 scans to the specific backlight source 101, the local-dimming control circuitry 203 reads the brightness information corresponding to the specific backlight source 101 from the buffer memory 204. For example, before scanning a first row of the backlight sources 101, the local-dimming control circuitry 203 reads brightness information corresponding to the first row of the backlight sources 101 from the buffer memory 204. For example, when scanning to a backlight source 101 in a third column of the first row according to the scanning axis X, the local-dimming control circuitry 203 reads brightness information corresponding to a backlight source 101 in a fourth column of the first row from the buffer memory 204.

A time interval between the time when the panel completes scanning and the time when next scanning starts is defined as a vertical blanking time. Therefore, according to some embodiments, before the local-dimming control circuitry 203 completes scanning of a frame F, the timing control circuitry 201 generates a transmission packet of a next frame F within the vertical blanking time, and the transmission packet is stored in the buffer memory 204 by the local-dimming control circuitry 203 in advance. In this way, the buffer memory 204 provides a buffer to avoid the problem of screen tearing due to an excessively large difference between a brightness information generating speed of the timing control circuitry 201 and a scanning speed of the local-dimming control circuitry 203.

Figure 5:
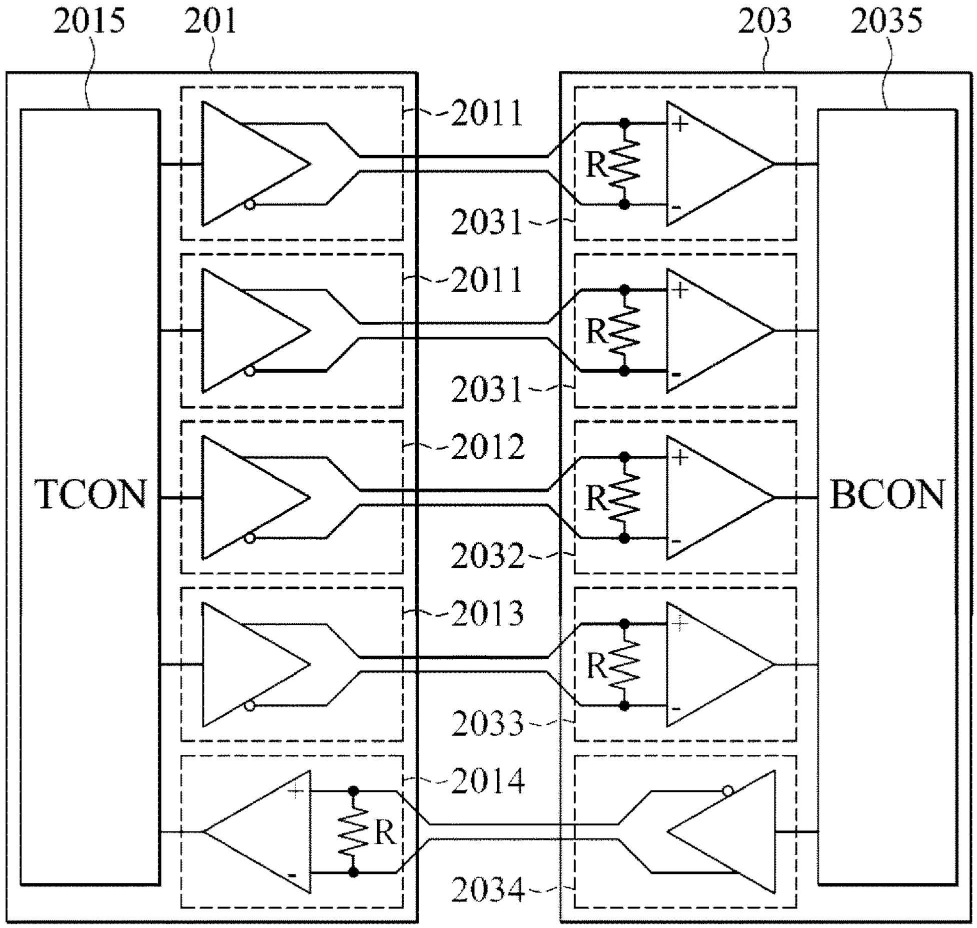
FIG. 5 is a schematic diagram of a timing control module and a local-dimming control module according to a second embodiment.
Figure 6:
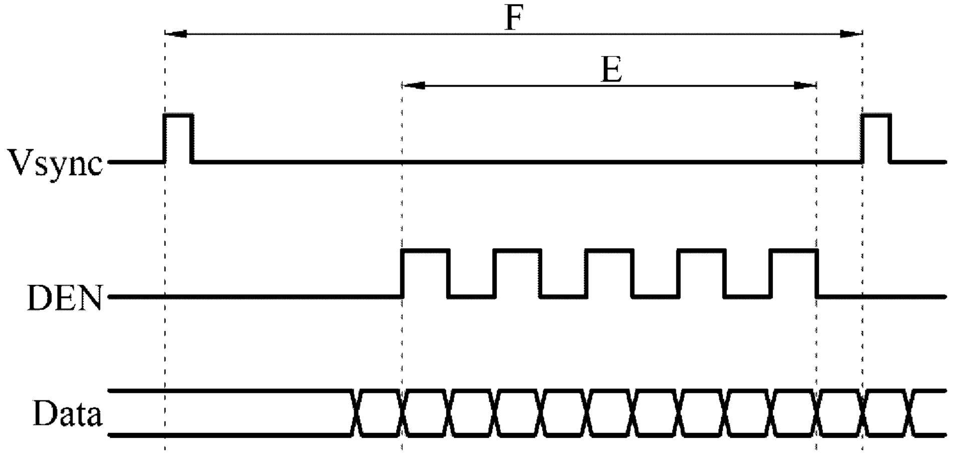
FIG. 6 is a schematic diagram of a differential signal according to some embodiments.

According to some embodiments, the timing control circuitry 201 transmits a synchronization signal Vsync to the local-dimming control circuitry 203, so that the brightness information generating speed is synchronized with the panel scanning speed. FIG. 5 is a schematic diagram of a timing control circuitry and a local-dimming control circuitry according to a second embodiment; and FIG. 6 is a schematic diagram of a differential signal according to some embodiments. Referring to FIG. 5 and FIG. 6 together, according to some embodiments, the timing control circuitry 201 includes the TCON 2015, a plurality of first differential circuits 2011, a second differential circuit 2012, a third differential circuit 2013, and a fourth receiving circuit 2014; and the local-dimming control circuitry 203 includes a plurality of first receiving circuits 2031, a second receiving circuit 2032, a third receiving circuit 2033, and a fourth differential circuit 2034, and the BCON 2035. According to some embodiments, the plurality of first differential circuits 2011 of the timing control circuitry 201 are respectively connected to the plurality of first receiving circuits 2031 of the local-dimming control circuitry 203; and the second differential circuit 2012 and the third differential circuit 2013 of the timing control circuitry 201 are respectively connected to the second receiving circuit 2032 and the third receiving circuit 2033 of the local-dimming control circuitry 203. According to some embodiments, the second differential circuit 2012 transmits the synchronization signal Vsync to the second receiving circuit 2032 at the beginning of each frame F, and the local-dimming control circuitry 203 begins scanning after receiving the synchronization signal Vsync. Therefore, the generation speed of brightness information within a range of each frame F is synchronized with the scanning speed of the local-dimming control circuitry 203. According to some embodiments, the third differential circuit 2013 transmits a data enable signal DEN to the third receiving circuit 2033 during a period of each frame F. The data enable signal DEN is used for marking an effective period E of a transmission packet transmitted by a first differential signal Data, to ensure the correctness of the transmission packet within a range of the effective period E.

According to some embodiments, the local-dimming control circuitry 203 generates a loopback packet according to a second customized content specification, and the fourth differential circuit 2034 transmits the loopback packet to the fourth receiving circuit 2014 of the timing control circuitry 201 according to a differential voltage level. According to some embodiments, the loopback packet includes compensation data, such as electrical compensation data or optical compensation data. According to some embodiments, the second customized content specification is used for compiling sensing information of a plurality of backlight sources 101 into the loopback packet, so that the loopback packet is adapted to be transmitted through the fourth differential circuit 2034. According to some embodiments, the second customized content specification is the same as the first customized content specification.

Drive currents of different backlight sources 101 may be different due to process variation or differences in loss cycles, thereby resulting in different brightness of different partitions on a same backlight panel 102. Therefore, according to some embodiments, each of the backlight sources 101 is coupled to a current detection circuit, and the current detection circuit measures the drive currents of the backlight sources 101 and generates the sensing information. The local-dimming control circuitry 203 receives the sensing information measured by each current detection circuit and generates the loopback packet.

According to some embodiments, the backlight control device 200 includes an optical sensing circuitry, where the optical sensing circuitry is configured to measure light source intensities of the backlight sources 101 to generate the sensing information. The local-dimming control circuitry 203 receives the sensing information corresponding to each of the backlight sources 101 and generates the loopback packet. The optical sensing circuitry may be, but is not limited to, a photodiode, a phototransistor, a photoresistor, a visible or invisible optical sensor.

According to some embodiments, the loopback packet includes a start byte, a data sequence, and an end byte. According to some embodiments, the start byte includes control information. The control information may be used for informing the timing control circuitry 201 of a quantity of bits of the sensing information. According to some embodiments, the control information enables the timing control circuitry 201 to identify the sensing information stored in each loopback packet, and each of the backlight sources 101 corresponding to the sensing information. Referring to FIG. 3A, the rest may be deduced by analogy, and taking sensing information of 12 bits as an example, DATA0[7:0] (8 bits) of the first field and DATA0[11:8] (4 bits) of the second field of the data sequence correspond to sensing information measured from the No. 0 backlight source 101.

Figure 7:
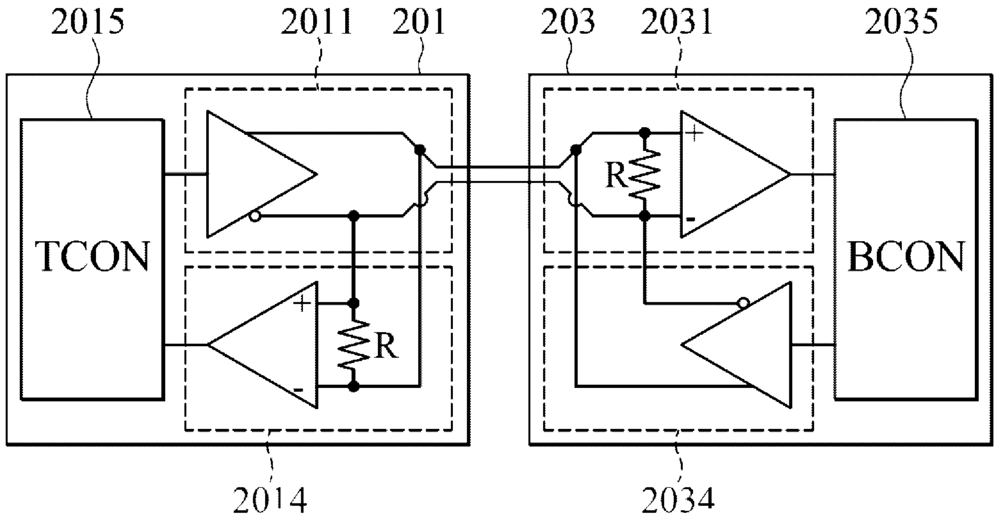
FIG. 7 is a schematic diagram of a timing control module and a local-dimming control module according to a third embodiment.

FIG. 7 is a schematic diagram of a timing control circuitry and a local-dimming control circuitry according to a third embodiment. Referring to FIG. 7, according to some embodiments, the timing control circuitry 201 includes the TCON 2015, the first differential circuit 2011, and the fourth receiving circuit 2014; and the local-dimming control circuitry 203 includes the first receiving circuit 2031, the fourth differential circuit 2034, and the BCON 2035, where the first receiving circuit 2031 is electrically coupled to the first differential circuit 2011 through a pair of transmission lines, the fourth differential circuit 2034 is connected to the first receiving circuit 2031 in parallel, and the fourth receiving circuit 2014 is connected to the first differential circuit 2011 in parallel. Therefore, according to some embodiments, a plurality sets of differential circuits use the same pair of transmission lines, which reduces the quantity of wires. In this way, the differential circuits allow half-duplex transmission between the timing control circuitry 201 and the local-dimming control circuitry 203. Referring to FIG. 1 together, the backlight control device 200 allows packet transmission in a transmission direction a or in a transmission direction b at the same time. According to some embodiments, the first differential circuit 2011 transmits the transmission packet according to a first duty ratio, the fourth differential circuit 2034 transmits the loopback packet according to a second duty ratio, and the first duty ratio is different from the second duty ratio. For example, the differential signal transmitted by the first differential circuit 2011 has the first duty ratio of 50%, and the differential signal transmitted by the fourth differential circuit 2034 has the second duty ratio of 80%. Therefore, the first receiving circuit 2031 parses the differential voltage level according to the first duty ratio of 50% to obtain the transmission packet, and the second receiving circuit 2032 parses the differential voltage level according to the second duty ratio of 80% to obtain the loopback packet. In this way, the differential circuits allow full-duplex transmission between the timing control circuitry 201 and the local-dimming control circuitry 203. Referring to FIG. 1 together, the backlight control device 200 allows packet transmission in a transmission direction c at the same time.

Figure 8:
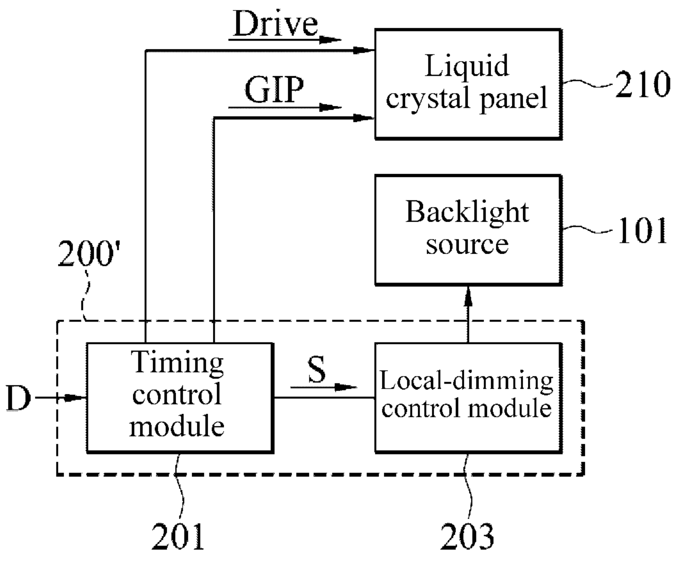
FIG. 8 is a schematic block diagram of a backlight control device and a liquid crystal panel according to some embodiments.

According to some embodiments, the backlight control device 200 is adapted to control the backlight sources 101 and a liquid crystal panel 210. FIG. 8 is a schematic block diagram of a backlight control device and a liquid crystal panel according to some embodiments. Referring to FIG. 8, according to some embodiments, the timing control circuitry 201 of a backlight control device 200' generates a differential signal S, and a differential voltage level of the differential signal S transmits the transmission packet to the local-dimming control circuitry 203, to control the backlight sources 101. In addition, the timing control circuitry 201 transmits a gate in panel (GIP) signal and a drive data signal Drive to the liquid crystal panel 210, to control the liquid crystal panel 210. The GIP signal allows the timing control circuitry 201 to scan and drive the liquid crystal panel 210 of the array, and the drive data signal Drive allows the timing control circuitry 201 to adjust RGB display of the liquid crystal panel 210. In this way, the timing control circuitry 201 simultaneously coordinates the display of the liquid crystal panel 210 and the backlight panel 102, which reduces the quantity of panel control chips and the coordination problem among the chips.

Figure 9A:
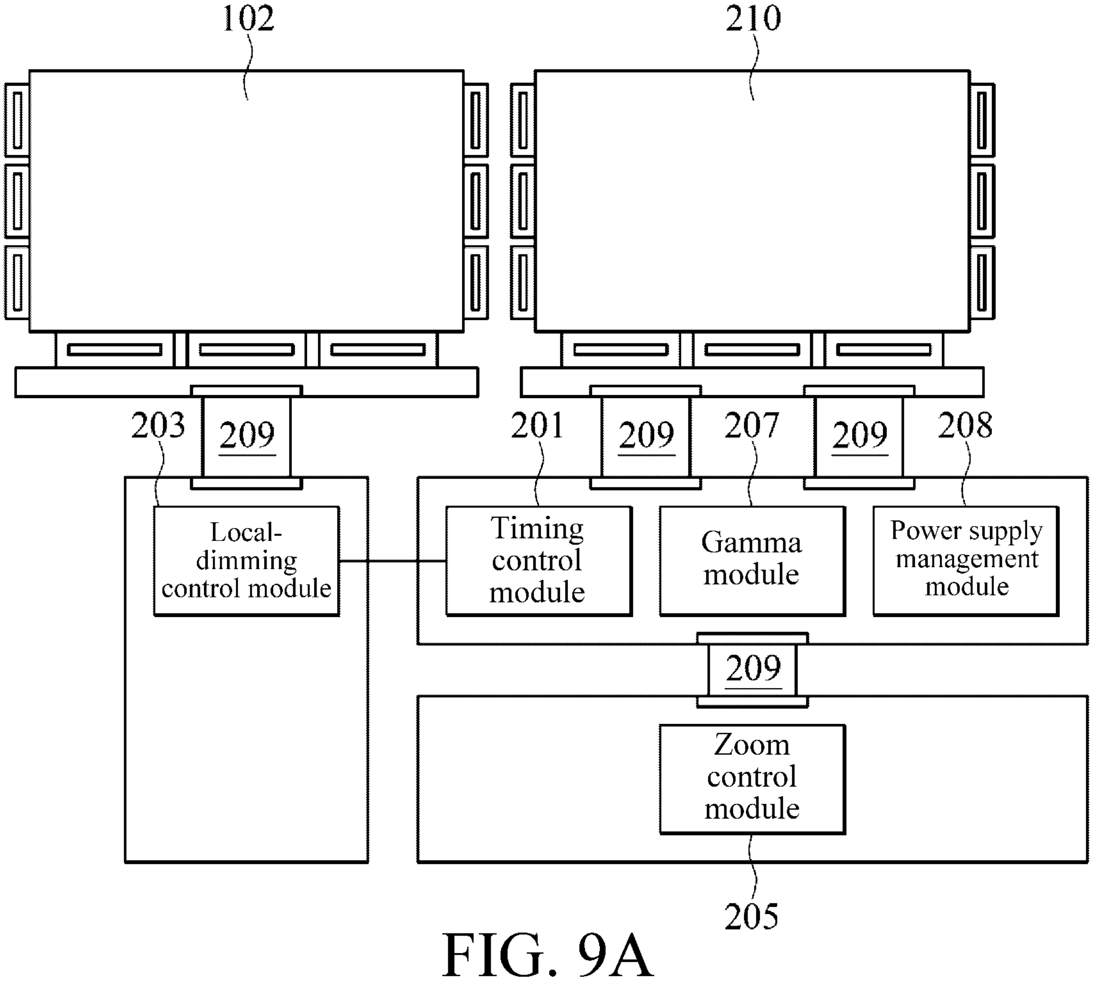
FIG. 9A is a schematic diagram of a backlight control device, a backlight panel, and a liquid crystal panel according to some embodiments.
Figure 9B:
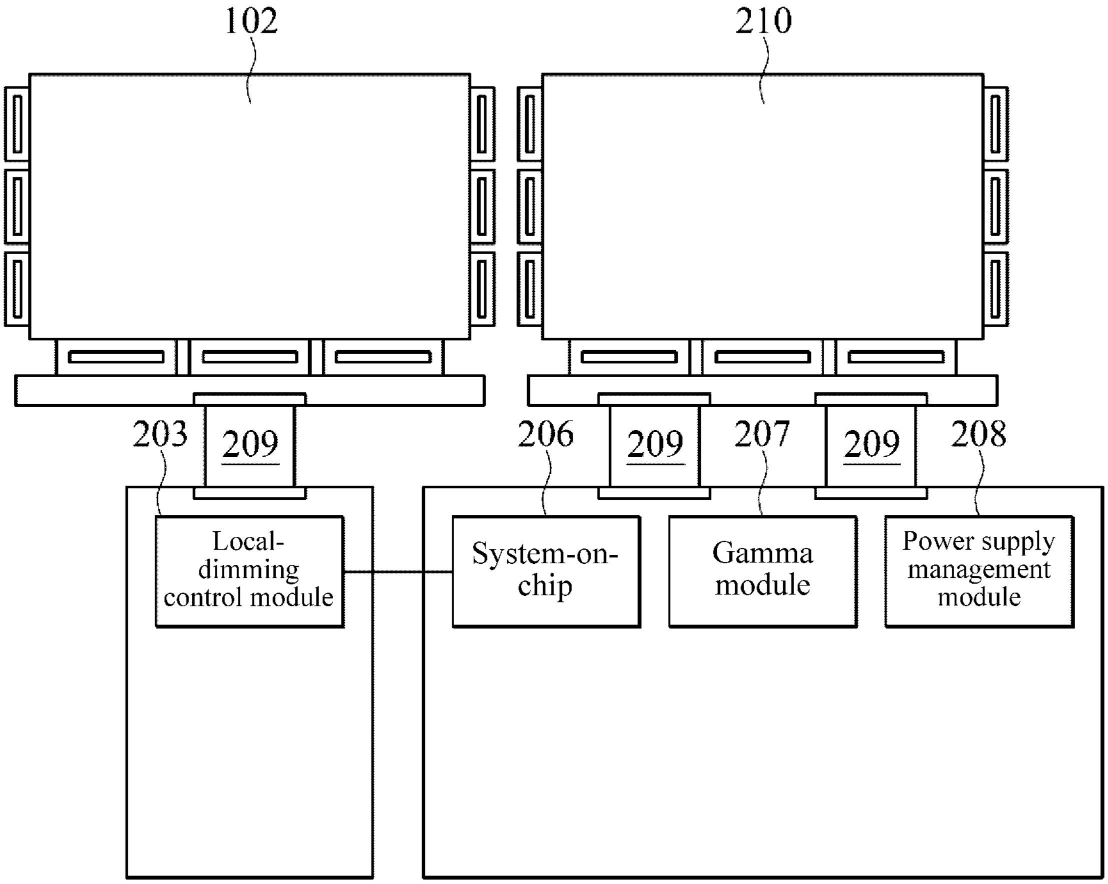
FIG. 9B is a schematic diagram of a backlight control device, a backlight panel, and a liquid crystal panel according to some other embodiments.

FIG. 9A is a schematic diagram of a backlight control device, a backlight panel, and a liquid crystal panel according to some embodiments; and FIG. 9B is a schematic diagram of a backlight control device, a backlight panel, and a liquid crystal panel according to some other embodiments. Referring to FIG. 9A first, according to some embodiments, the backlight control device 200 includes the local-dimming control circuitry 203, the timing control circuitry 201, a Gamma circuitry 207, a power supply management circuitry 208, and a zoom control circuitry 205. The Gamma circuitry 207 performs voltage correction of a grayscale image. The power supply management circuitry 208 is in charge of power supply management of each circuitry. The zoom control circuitry 205 performs zoom processing on image data D of different resolutions, to meet a display specification of the liquid crystal panel 210 or the backlight panel 102. According to some embodiments, the zoom control circuitry 205 is externally connected to the timing control circuitry 201 through a flat cable 209. According to some embodiments, referring to FIG. 9B, the zoom control circuitry 205 and the timing control circuitry 201 are integrated into a system-on-chip 206.

As described above, according to some embodiments, the local-dimming control circuitry 203 includes the buffer memory 204. After the timing control circuitry 201 rapidly transmits the transmission packet to the local-dimming control circuitry 203 through the differential circuit, the local-dimming control circuitry 203 temporarily stores the transmission packet in the buffer memory 204, to provide a buffer for the generation speed and scanning speed of the transmission packet. According to some embodiments, the timing control circuitry 201 transmits the synchronization signal Vsync to the local-dimming control circuitry 203, to make the local-dimming control circuitry 203 synchronized with the timing control circuitry 201, and avoid the problem of screen tearing. According to some embodiments, the local-dimming control circuitry 203 transmits the loopback packet including the compensation data of the backlight sources 101 to the timing control circuitry 201, so that the timing control circuitry 201 can adjust the brightness information corresponding to each of the backlight sources 101 according to the compensation data. According to some embodiments, the backlight control device 200 provides simplex, half-duplex, or full-duplex data transmission, to meet simultaneous or non-simultaneous data transmission needs.

What is claimed is:

1. A device adapted for controlling a plurality of backlight sources, the device comprising:

a timing control circuitry, configured to generate a transmission packet according to a first customized content specification, wherein the transmission packet comprises control information and brightness information, the timing control circuitry comprises a digital-to-analog converter and a first differential circuit, the digital-to-analog converter is configured to convert the transmission packet into a differential voltage level and the first differential circuit is configured to transmit the differential voltage level; and a local-dimming control circuitry, comprising an analog-to-digital converter and a first receiving circuit, where the first receiving circuit is electrically coupled to the first differential circuit, the first receiving circuit is configured to receive the differential voltage level, the analog-to-digital converter is configured to convert the differential voltage level back into the transmission packet, and the local-dimming control circuitry is configured to transmit a light source control signal according to the control information and the brightness information.

2. The device according to claim 1, further comprising: a buffer memory, electrically coupled to the local-dimming control circuitry, and configured to temporarily store the transmission packet.

3. The device according to claim 2, wherein the local-dimming control circuitry is configured to transmit the light source control signal to the plurality of backlight sources one by one in a scanning manner, and when the local-dimming control circuitry scans to a specific backlight source, the local-dimming control circuitry reads brightness information corresponding to the specific backlight source from the buffer memory.

4. The device according to claim 3, wherein the timing control circuitry is configured to generate the transmission packet frame by frame, and the transmission packet comprises a plurality of pieces of brightness information respectively corresponding to the plurality of backlight sources within a range of a frame.

5. The device according to claim 4, wherein the timing control circuitry is configured to generate a plurality of transmission packets frame by frame, the timing control circuitry comprises a plurality of first differential circuits, and the plurality of first differential circuits are configured to separately transmit the plurality of transmission packets according to the differential voltage level.

6. The device according to claim 1, wherein the timing control circuitry comprises a second differential circuit configured to transmit a synchronization signal, the local-dimming control circuitry comprises a second receiving circuit electrically coupled to the second differential circuit, and the second receiving circuit is configured to receive the synchronization signal.

7. The device according to claim 6, wherein the timing control circuitry comprises a third differential circuit configured to transmit a data enable signal, the local-dimming control circuitry comprises a third receiving circuit electrically coupled to the third differential circuit, and the third receiving circuit is configured to receive the data enable signal.

8. The device according to claim 1, wherein the local-dimming control circuitry is further configured to generate a loopback packet according to a second customized content specification, the loopback packet comprises control information and sensing information, the local-dimming control circuitry further comprises a fourth differential circuit configured to transmit the loopback packet according to the differential voltage level, the timing control circuitry further comprises a fourth receiving circuit electrically coupled to the fourth differential circuit, and the fourth receiving circuit is configured to receive the loopback packet.

9. The device according to claim 8, further comprising: an optical sensing circuitry, coupled to the local-dimming control circuitry, wherein the optical sensing circuitry is configured to measure light source intensities of the backlight sources, and transmit the sensing information to the local-dimming control circuitry, and the local-dimming control circuitry is configured to generate the loopback packet according to the sensing information.

10. The device according to claim 8, wherein the first receiving circuit is electrically coupled to the first differential circuit through a pair of transmission lines, the fourth receiving circuit is electrically coupled to the fourth differential circuit through the pair of transmission lines, the first differential circuit is configured to transmit the transmission packet according to a first duty ratio, the fourth differential circuit is configured to transmit the loopback packet according to a second duty ratio, and the first duty ratio is different from the second duty ratio.

11. The device according to claim 1, wherein the transmission packet comprises a start byte, a data sequence, and an end byte, the start byte comprises the control information, and the data sequence comprises the brightness information corresponding to the backlight sources.

12. The device according to claim 1, adapted to control the plurality of backlight sources and a liquid crystal panel, wherein the timing control circuitry is further configured to transmit a gate in panel (GIP) signal and a drive data signal to the liquid crystal panel, to control the liquid crystal panel.

13. The device according to claim 12, further comprising: a zoom control circuitry, wherein the timing control circuitry and the zoom control circuitry are integrated into a system-on-chip.

14. The device according to claim 1, wherein a configuration of the first differential circuit is low voltage differential signaling (LVDS), emitter coupled logic (ECL), positive emitter coupled logic (PECL), or current mode logic (CML).

* * * * *